(12) United States Patent
Sugawara

(10) Patent No.: US 7,609,294 B2
(45) Date of Patent: Oct. 27, 2009

(54) IMAGE PICK-UP APPARATUS CAPABLE OF TAKING MOVING IMAGES AND STILL IMAGES AND IMAGE PICKING-UP METHOD

(75) Inventor: Atsushi Sugawara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 667 days.

(21) Appl. No.: 11/350,530

(22) Filed: Feb. 8, 2006

(65) Prior Publication Data

US 2006/0215040 A1 Sep. 28, 2006

(30) Foreign Application Priority Data

Mar. 22, 2005 (JP) ............... 2005-081589

(51) Int. Cl.
*H04N 5/225* (2006.01)
(52) U.S. Cl. .................... 348/220.1; 348/335
(58) Field of Classification Search .......... 348/208.11
See application file for complete search history.

(56) References Cited

U.S. PATENT DOCUMENTS

| | | | | |
|---|---|---|---|---|
| 5,815,748 A | * | 9/1998 | Hamamura et al. | ......... 396/104 |
| 5,856,664 A | * | 1/1999 | Suzuki et al. | ............ 250/201.2 |
| 5,966,553 A | * | 10/1999 | Nishitani et al. | ............ 396/303 |
| 6,928,241 B2 | | 8/2005 | Hirai | |
| 7,006,140 B2 | * | 2/2006 | Shono | ......................... 348/349 |
| 2004/0155976 A1 | * | 8/2004 | Suda | ......................... 348/345 |
| 2005/0024515 A1 | * | 2/2005 | Ikehata et al. | .......... 348/333.02 |
| 2005/0062877 A1 | * | 3/2005 | Yuyama | ..................... 348/371 |
| 2007/0086774 A1 | * | 4/2007 | Fuchimukai | ................. 396/354 |

FOREIGN PATENT DOCUMENTS

| | | |
|---|---|---|
| CN | 1495460 A | 5/2004 |
| JP | 07-143439 A | 6/1995 |
| JP | 8-25475 A | 10/1996 |
| JP | 2004-187058 A | 7/2004 |
| JP | 2004-264832 A | 9/2004 |

* cited by examiner

*Primary Examiner*—Tuan V Ho
(74) *Attorney, Agent, or Firm*—Canon U.S.A., Inc., IP Division

(57) ABSTRACT

At least one exemplary embodiment is directed to an apparatus where a still image can be picked up during the recording of moving images, where still images are picked-up in a first state, in which part of a luminous flux is transmitted through a mirror unit to an image-capturing device, or a second state, where the entire luminous flux is introduced to the image-capturing device.

21 Claims, 9 Drawing Sheets

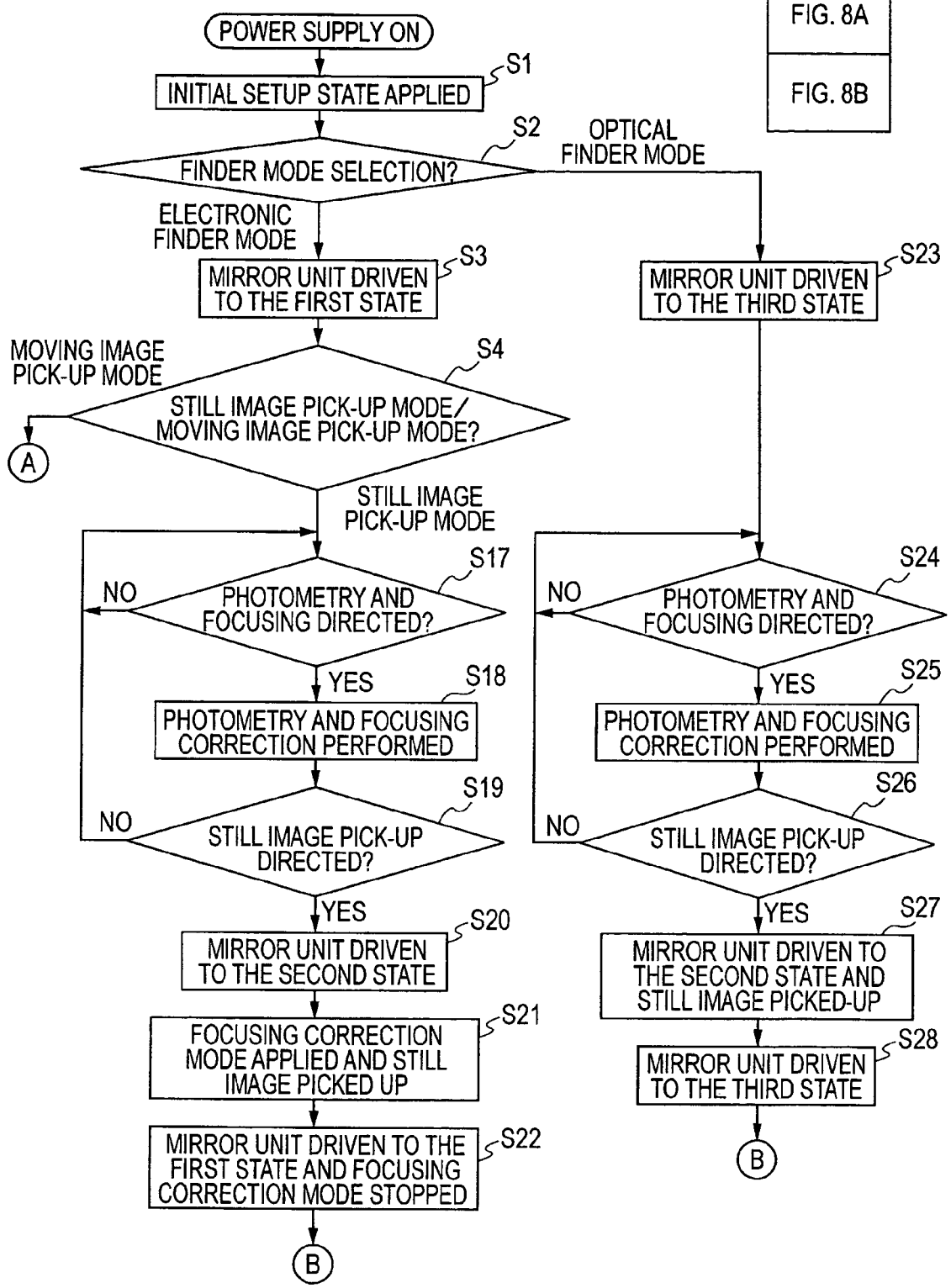

IMAGE PICK-UP APPARATUS CAPABLE OF TAKING MOVING IMAGES AND STILL IMAGES AND IMAGE PICKING-UP METHOD

BACKGROUND OF THE INVENTION

1. Field of the Invention

The present invention relates to image pick-up apparatuses and in particular, though not exclusively, relates to an image pick-up apparatus having a mirror unit arranged on an optical path between an object and an image capturing device.

2. Description of the Related Art

In a single lens reflex camera, an example of an image pick-up apparatus, during observing an object using an optical finder, a luminous flux emitted from a taking lens is reflected by a reflection mirror arranged adjacent to an image plane from the taking lens and introduced to the optical finder including a pentacle prism. Thereby, a picture taker can observe an object image formed by the taking lens as an elect image. At this time, the reflection mirror is obliquely arranged on the optical path.

On the other hand, in order to take a picture of the object image, the luminous flux from the taking lens is allowed to reach an image pick-up medium (e.g., in the image capturing device e.g., a film and a CCD) by moving the reflection mirror from the optical path. Upon completion of taking a picture, the reflection mirror is obliquely arranged on the optical path.

In a single lens reflex camera having a pellicle mirror, there can be a camera capable of taking a picture by allowing a luminous flux which has transmitted through the pellicle mirror to reach an image capturing device or a film without moving the pellicle mirror even when a picture of an object image is taken.

In the camera discussed in Japanese Patent Laid-Open No. H08-254751, taking a picture by moving the pellicle mirror away from the optical path and taking a picture without moving the pellicle mirror are used depending on imaging conditions, and when taking a picture without moving the pellicle mirror, it is characteristic of the conventional camera to not darken a finder image and to operate quietly even during releasing a shutter.

Conventional single lens reflex digital cameras typically include a camera capable of switching between a state where the luminous flux from the taking lens is divided into a finder optical system and a phase-difference detection AF unit for detecting focusing, and a state where the luminous flux from the taking lens is divided into the image capturing device and the phase-difference detection AF unit for detecting focusing. In the camera discussed in Japanese Patent Laid-Open No. 2004-264832, the state where the luminous flux from the taking lens is divided into the finder optical system and the AF unit, an object image can be observed using an optical finder. In the state where the luminous flux from the taking lens is divided into the image capturing device and the AF unit, an object image can be observed using an electronic finder driven by an output from the image capturing device with a display unit arranged on the camera back face. Also, even when any one of the optical finder and the electronic finder is set, high-speed auto focusing can be executed by introducing part of the luminous flux from the taking lens to the phase-difference detection AF unit.

Recently, a market need has arisen for a moving image capturing function for single lens reflex cameras; however, conventional single lens reflex cameras which capture images by moving a reflection mirror are structurally difficult to pick up moving images. Thus, a camera discussed in Japanese Patent Laid-Open No. 2004-264832 is constructed to have three positions of a mirror unit, including one for taking a moving picture as well as automatically focusing in a phase-difference system.

Furthermore, another desired feature is to record only a specific scene in still images during capturing moving images. For instance, for a footrace of school athletic meets, during shooting moving images, it might be desirable to also obtain the finishing line still image of a runner, while the moving images are captured. For example, using the camera configuration in Japanese Patent Laid-Open No. 2004-264832. Because of the need for switching between modes of moving image pick up (also herein referred to as the moving image picking up) and still image pick up (also referred to herein as the still image picking up), a predetermined period of time can be required for the switching, so that a picture taker may miss a shutter chance.

Also, the single lens reflex camera having a pellicle mirror and discussed in Japanese Patent Laid-Open No. H08-254751 has a problem that a plurality of imaging modes cannot be continuously switched such that a still image cannot be picked up during taking moving images.

SUMMARY OF THE INVENTION

At least one exemplary embodiment is directed to an image pick-up apparatus configured to take moving images and still images contemporaneously.

At least one exemplary embodiment is directed to an image pick-up apparatus and an image pick-up method, which are capable of being switched to a high quality still image capturing mode during the process of taking moving images.

At least one exemplary embodiment is directed to an image pick-up apparatus which includes: an image-capturing device configured to photo-electrically convert an object image formed by a luminous flux from a taking lens; a mirror unit including a half mirror occupying at least part of the region of the mirror unit; a drive unit configured to select a position of the mirror unit to be between a first state, where part of the luminous flux is transmitted through the mirror unit to the image-capturing device while the residual luminous flux is reflected to a predetermined unit, and a second state, where the entire luminous flux is introduced to the image-capturing device without being reflected by and transmitted through the mirror unit. Additional exemplary embodiments include configurations of the apparatus having a moving image pick-up mode for picking-up moving images and a still image pick-up mode for picking-up still images. Additionally at least one apparatus in accordance with at least one exemplary embodiment includes a control unit configured to pick up still images in the first state similar to the apparatus's ability to pick up still images during picking up moving images in the moving image pick-up mode. Additionally an apparatus in accordance with at least one exemplary embodiment can also be configured to pick up still images after the mirror unit is driven by the drive unit from the first state to the second state when picking up still images in the still image pick-up mode.

At least one further exemplary embodiment is directed to an image pick-up apparatus which includes an image-capturing device configured to photo-electrically convert an object image formed by a luminous flux from a taking lens; a mirror unit which includes a half mirror occupying at least part of the region of the mirror unit; a drive unit configured to select a position of the mirror unit to be between a first state, where part of the luminous flux is transmitted through the mirror unit to the image-capturing device while the residual luminous flux is reflected to a predetermined unit, and a second state where the entire luminous flux is introduced to the image-capturing device without being reflected by and transmitted through the mirror unit; and a control unit configured to pick up still images in the first state similar to the apparatus's ability to pick up still images during picking up moving images. Additionally an apparatus in accordance with at least one exemplary embodiment can also be configured to pick up still images after the mirror unit is driven by the drive unit from the first state to the second state when picking up still images and the moving images are not picked up.

At least one further exemplary embodiment is directed to an image pick-up apparatus which includes an image-capturing device configured to photo-electrically convert an object image formed by a luminous flux from a taking lens; a main mirror unit which includes a half mirror occupying at least part of the region of the main mirror unit; a sub-mirror unit including a total reflection mirror; an optical finder configured to observe the object image; an AF (auto focus) unit configured to detect the focusing state of the taking lens with a phase-difference system; a drive unit configured to switch the main mirror unit and the sub-mirror unit among a first, second, and third state, where the first state is where a part of the luminous flux is reflected to the AF unit while the residual luminous flux is introduced to the image-capturing device by moving the sub-mirror unit from the luminous flux, a second state is where the entire luminous flux is introduced to the image-capturing device without being reflected by and transmitted through the main mirror unit and the sub-mirror unit, and a third state is where a part of the luminous flux is reflected by the main mirror unit to the optical finder while the transmitted residual luminous flux is introduced to the AF unit by reflecting it at the sub-mirror unit an electronic finder configured to electronically display an object signal formed on the image-capturing device in the first state on a display unit. Additional configurations of the apparatus, according to at least one exemplary embodiment, includes a moving image pick-up mode for picking up moving images and a still image pick-up mode for picking up still images; and a control unit for picking up still images in the first state similar to the apparatus's ability to pick up still images during picking up moving images in the moving image pick-up mode in the first state, and also picking up still images after the mirror unit has been driven by the drive unit from the first state or the third state to the second state when picking up still images in the still image pick-up mode.

At least one exemplary embodiment is directed to an image pick-up method for an image pick-up apparatus including an image-capturing device configured to photo-electrically convert an object image formed by a luminous flux from a taking lens and a mirror unit which includes a half mirror occupying at least part of the region of the mirror unit. The method includes setting a mode to a moving image pick-up mode or a still image pick-up mode. Additionally the a first still image pick-up in a first state is similar to the image pick-up when the moving image pick-up mode is set by a setting step and if picking up still images is directed during picking up moving images after the moving image picking up is started, part of the luminous flux is transmitted through the mirror unit to the image-capturing device while the residual luminous flux is reflected to a predetermined unit. Additionally, a second still image pick-up can occur after the mirror unit is driven to a second state where the moving image pick-up mode is set by the setting step and if picking up still images is directed, the entire luminous flux is introduced to the image-capturing device without being reflected by and transmitted through the mirror unit.

At least one further exemplary embodiment is directed to an image pick-up method for an image pick-up apparatus including an image-capturing device configured to photo-electrically convert an object image formed by a luminous flux from a taking lens; a main mirror unit which includes a half mirror occupying at least part of the region of the main mirror unit; a sub-mirror unit including a total reflection mirror; an optical finder configured to observe the object image; and an AF unit configured to detect the focusing state of the taking lens with a phase-difference system, the method includes selling a mode in a moving image pick-up mode or a still image pick-up mode. Additionally the first static image pick-up in a first state is similar to the image pick-up where part of the luminous flux is reflected by the main mirror unit to the AF unit while the residual luminous flux is introduced to the image-capturing device, when the moving image pick-up mode is set by the setting step and if picking up static images is directed during picking up moving images after the moving image picking up is started. Additionally a second static image is picked-up after the main mirror unit is driven from the first state or a third state to a second state where a part of the luminous flux is reflected by the main mirror unit to the optical finder while the transmitted residual luminous flux is reflected by the sub-mirror unit to the AF unit, where the entire luminous flux is introduced to the image-capturing device without being reflected by and transmitted through the main mirror unit and the sub-mirror unit, when the moving image pick-up mode is set by the setting step and if picking up static images is directed.

Further features of the present invention will become apparent from the following description of exemplary embodiments with reference to the attached drawings, in which like reference characters designate the same or similar parts throughout the figures thereof.

BRIEF DESCRIPTION OF THE DRAWINGS

The accompanying drawings, which are incorporated in and constitute a part of the specification, illustrate exemplary embodiments of the invention.

FIGS. 8A and 8B are flowcharts showing the operation of the camera according to the second exemplary embodiment.

DESCRIPTION OF THE EMBODIMENTS

Figure 1:
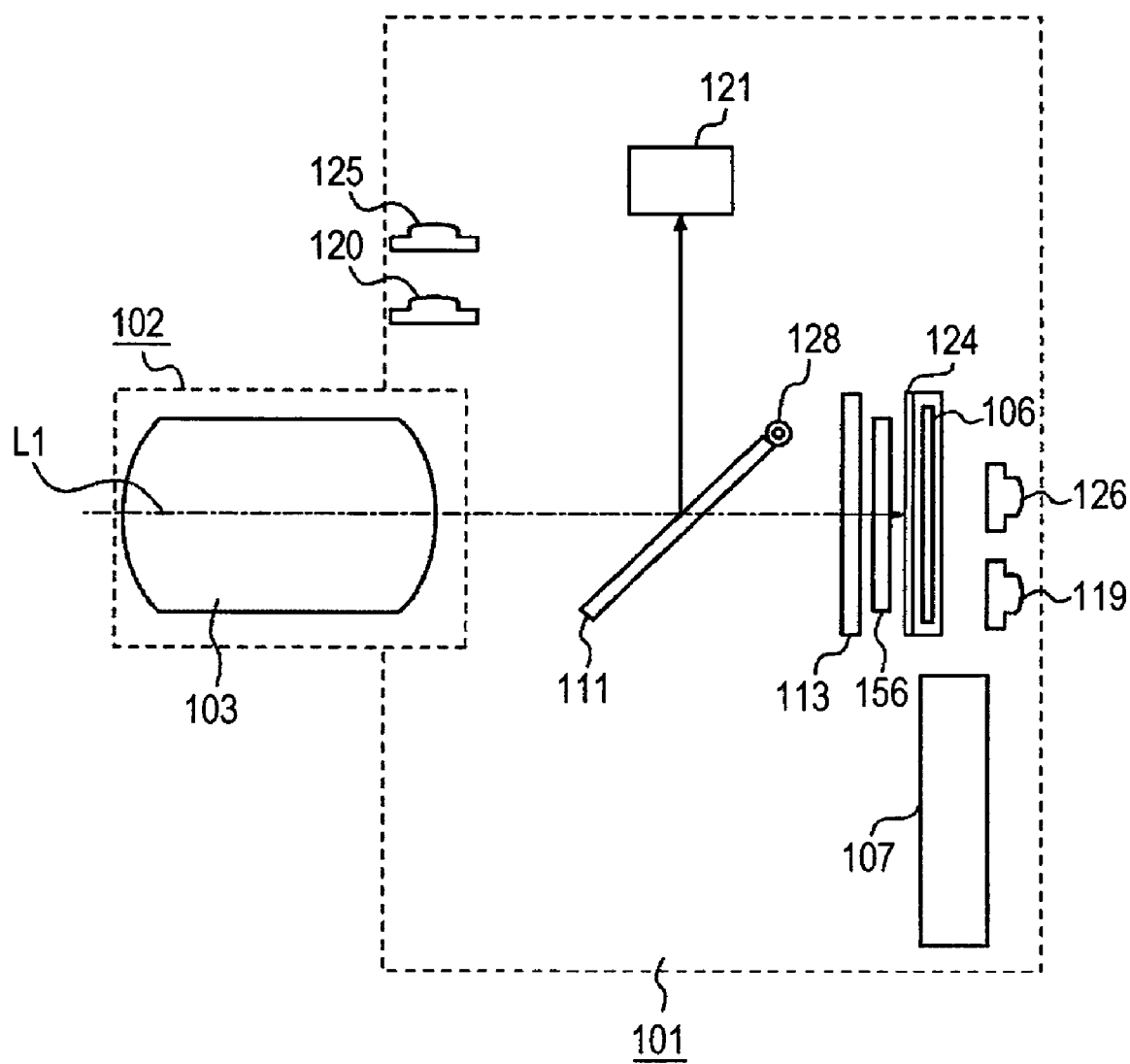
FIG. 1 is a schematic view of a configuration of a camera according to a first exemplary embodiment.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate.

Notice that similar reference numerals and letters refer to similar items in the following figures, and thus once an item is defined in one figure, it may not be discussed for following figures.

Exemplary embodiments of the present invention will be described in detail in accordance with the accompanying drawings.

First Exemplary Embodiment

A camera according to a first exemplary embodiment will be described with reference to FIGS. 1 to 4.

FIG. 1 is a schematic sectional view of the camera according to the exemplary embodiment viewed from the side. This is a single chip digital camera using an image-capturing device, (e.g., a CCD (charge coupled device) or a CMOS (complementary metal-oxide semiconductor)), where an image signal can represent a moving image or a still image and can be generated by driving the image-capturing device continuously or sporadically. The image-capturing device can be an area sensor configured to store an electric charge corresponding to an amount of light, where the conversion of received light into an electric signal for each pixel can be accumulated to form the electric charge.

Referring to FIG. 1, a plurality of lens device 102 with different focal lengths can be detachably attached to a camera body 101. By changing the lens device 102, picture planes with various angles of view can be obtained.

The lens device 102 includes a drive mechanism (not shown) which can control focus by moving a focusing lens constituting an image-formation optical system 103 in a direction along an optical axis L1. The lens device 102 is also provided with a diaphragm 143 (FIG. 2) for adjusting the amount of light of an imaging luminous flux passing through the diaphragm by changing an opening space of a light passage, and a drive mechanism (not shown) for driving the diaphragm 143, which can be arranged within the lens device 102.

An image-capturing device 106 can be accommodated within a package 124. Along an optical path ranging from the image-formation optical system 103 to the image-capturing device 106, an optical low-pass filter 156 is arranged so as to limit a high-frequency component of an incident luminous flux so that an excessively higher spatial frequency component of an object image is not transmitted to the image-capturing device 106.

An object image captured by the image-capturing device 106 is displayed on a display unit 107 after a predetermined image process. The display unit 107 is attached (e.g., on the back face of the operation unit in the camera body 101) so that a picture taker can directly observe the images displayed on the display unit 107. The display unit 107 can generally include any imaging display panel type for example a liquid crystal panel. The image-capturing device 106 can include various types of image sensors (e.g., a CMOS process compatible sensor (CMOS sensor)). For example, a CMOS sensor can have a feature of being randomly accessible to an arbitrary pixel, and can easily read out images by thinning out them for displaying, so that a real-time display can be performed with a high display-rate. The image-capturing device 106 can output display images and high-definition images using the above-features.

A main mirror 111, including a half mirror, divides one optical path into two optical paths by directing part of a luminous flux from the image-formation optical system 103 to an AF unit 121 (FIG. 1) as well as allowing the residual luminous flux to transmit through the main mirror 111. The main mirror 111, having a movable structure, can be switched between an obliquely arranged state on the imaging optical path (optical axis L1) and an evacuated (removed) state from the imaging optical path.

A focal-plane shutter (referred to as a shutter below) 113 includes a first curtain and a second curtain, which can include a plurality of light exclusion blades. In the shutter 113, during non-imaging, an imaging luminous flux is shielded by covering an aperture with the first curtain or the second curtain, while during imaging, the imaging luminous flux is passed toward an image plane by moving the first curtain and the second curtain so as to form a slit facilitating light passage.

Reference numeral 119 denotes a main switch for activating the camera.

Using, for example a two-step push-type release button 120, one can initiate a multi-step process for taking still images, for example by a first-step pushing, an imaging preparatory operation (focusing operation and photometric operation) is started and by a second-step pushing, an imaging operation is started. In the description of the exemplary embodiment, the first-step pushing state of the release button 120 is referred to as the turned-on state of a switch SW1 and the second-step pushing state of the release button 120 is referred to as the turned-on state of a switch SW2.

One can also initiate, for example using a trigger button 125, taking moving images, for example the start and the stop of moving image picking up operation can be repeated at every pushing of the trigger button 125, and the control state of this operation can be displayed on the display unit 107.

The AF unit 121 detects a focusing state with a phase-difference detection system. Since the focus detection with the phase-difference detection system is a known technique, discussion of the specific control is omitted.

As described above, the main mirror 111 has a movable structure so as to selectively have two states that are a first optical path state (first state) for introducing light to the image-capturing device 106 and the AF unit 121 and a second optical path state (second state) for directly receiving light from the image-formation optical system 103 to the image-capturing device 106.

In the camera according to the exemplary embodiment, not only still images but also moving images can be picked up by continuously recording images received by the image-capturing device 106, so that a picture taker can use the camera by choosing between a still image pick-up mode and a moving image pick-up mode. Using a mode-switching button 126 for switching the mode, the still image pick-up mode and the moving image pick-up mode can be switched at every pushing of the mode-switching button 126.

Figure 2:
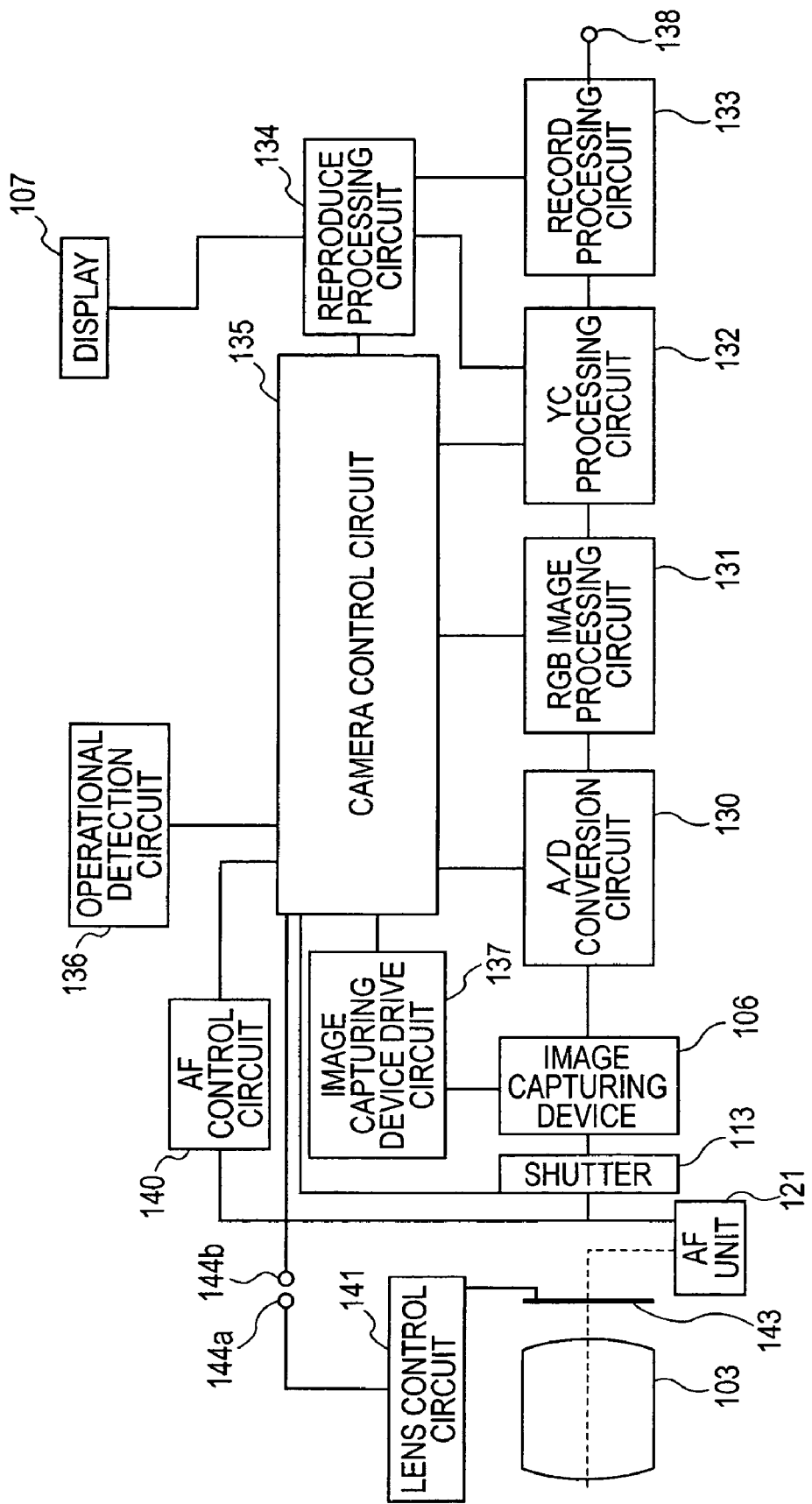
FIG. 2 is a block diagram of a circuit of the camera according to the first exemplary embodiment.

FIG. 2 is a block diagram showing an electric configuration of the camera according to the exemplary embodiment. This camera includes an imaging system, an image processing system, a recording/reproducing system, and a control system. First, the imaging and recording of an object will be described. In the drawing, like reference characters designate like components common to FIG. 1.

The imaging system includes the image-formation optical system 103 and the image-capturing device 106. The image processing system includes an A/D converter 130, an RGB image processing circuit 131, and a YC processing circuit 132. In addition, the operational detection circuit 136 also detects the state of the mode-switching button 126, and switches the mode between the still image pick-up mode and the moving image pick-up mode.

A standardized connection terminal 138 is connected to an external computer for sending/receiving data. The electric circuit mentioned above is driven by a secondary cell (not shown).

The imaging system is an optical processing system for focusing light from an object on the imaging plane of the image-capturing device 106 via the image-formation optical system 103 so as to expose the image-capturing device 106 to the object light with an appropriate light amount by adjusting the diaphragm (light amount adjustment unit) 143 arranged within the lens device 102 (FIG. 1) and the movement of the front and second curtains of the shutter 113 if necessary.

The image-capturing device 106 can include numerous pixels, for example 3700 square pixels in a long-side direction and 2800 square pixels in a narrow-side direction, about 10,000,000 pixels in total, so as to form a so-called Bayer matrix where color filters R (red), G (green), and B (blue) are alternately arranged to each pixel so as to group the pixels into sets of four pixels. In the Bayer matrix, the overall image performance is improved by arranging G pixels, which are sensitive to a photographer, more than R and B pixels in number. In at least one exemplary embodiment, in the image processing, using the image-capturing device 106, the luminance signal can be mainly produced from G pixels and the color signal can be produced from R, G, and B pixels.

An image signal read out of the image-capturing device 106 is supplied to the image processing system via the A/D conversion circuit 130 (herein also referred to as the A/D converter). The A/D converter 130 is a signal conversion circuit for converting a signal of each exposed pixel into a 10-bit digital signal, for example, corresponding to its amplitude so as to be output. The image signal processing thereafter can be executed in digital. The image processing system can be a signal processing system for obtaining an image signal, with a desired style, from RGB digital signals, and can convert RGB color signals into luminance signals, Y and YC, signals expressed by color-difference signals (R−Y) and (B−Y).

An RGB image processing circuit 131 can be a signal processing circuit for processing the image signal of the totality of pixels, in the present non-limiting example 3700×2800 pixels, received from the image-capturing device 106 via the A/D converter 130, and includes a white balance circuit and a gamma correction circuit.

A YC processing circuit 132 can be a signal processing circuit for producing the luminance signal Y and the color-difference signals (R−Y) and (B−Y). The YC processing circuit 132 can include a high-frequency luminance signal generating circuit for generating a high-frequency luminance signal YH, a low-frequency luminance signal generating circuit for generating a low-frequency luminance signal YL, and a color-difference signal generating circuit for generating the color-difference signals (R−Y) and (B−Y). The luminance signal Y can be produced by combining the high-frequency luminance signal YH with the low-frequency luminance signal YL.

The recording/reproducing system is a processing system for outputting an image signal to a memory (recording medium, not shown) and outputting an image signal to the display unit 107. A record processing circuit 133 can be configured to store an image signal on the memory and read it therefrom. A reproduce processing circuit 134 can be configured to reproduce the image signal, read out of the memory, so as to output it to the display unit 107. The record processing circuit 133 compresses the YC signals representing a still image and a moving image with a predetermined compression system (e.g., JPEG (joint photographic experts group) compression) and can also include a compression/decompression circuit (not shown) for decompressing compressed data when the compressed data is read out. The compression/decompression circuit includes a frame memory for processing signals, and stores the YC signals from the image processing system in the frame memory every frame so as to compress/encode the signals by reading them out for each of a plurality of blocks. The compression/encoding can be executed by two-dimensionally and orthogonally transforming, normalizing, and Huffman coding image signals every block.

The reproduce processing circuit 134 can be configure to convert the luminance signal Y and the color-difference signals (R−Y) and (B−Y) into RGB signals with matrix conversion. The signals converted by the reproduce processing circuit 134 can be outputted to the display unit 107 so as to display (reproduce) visible images thereon. The reproduce processing circuit 134 and the display unit 107 can be connected together via a radio communication channel (e.g., Bluetooth). By such a configuration, images pictured by the camera can be monitored at a remote place.

On the other hand, the operational detection circuit 136, constituting the control system, can detect operations of the release button 120 for taking still images and the trigger button 125 for taking moving images. Note that in at least one exemplary embodiment the trigger button 125 and the release button 120 can be combined into one composite button.

A camera control circuit 135 can control the driving of components in the camera including the main mirror 111 in accordance with a detection signal of the operational detection circuit 136 so as to produce and output a timing signal during shooting.

An image capturing device drive circuit 137 can produce a drive signal for driving the image-capturing device 106 under the control of the camera control circuit 135.

Next, the focusing will be described.

To the camera control circuit 135, an AF control circuit 140 and a lens control circuit 141 are operatively connected. These control circuits (140 and 141) communicate data, which can be used for processing, to each other and/or the camera control circuit 135.

The AF control circuit 140 can produce a focus detection signal by receiving the output signal of the AF unit 121 so as to detect a focusing state (defocus amount) of the image-formation optical system 103. Upon detecting the defocus amount, it can be converted into the drive amount of a focusing lens constituting the image-formation optical system 103 so as to feed it to the lens control circuit 141 (e.g., via the camera control circuit 135). To image a moving object, the drive amount of the focusing lens is directed on the basis of an appropriate lens stop position estimated in consideration of a time lag from the pushing of the release button 120 to the start of the actual image picking up. Upon receiving the drive amount of the focusing lens fed from the camera control circuit 135, the lens control circuit 141 can control focusing by moving the focusing lens in the direction of the optical axis L1 by a drive mechanism (not shown) in the lens device 102. When the AF control circuit 140 detects the focusing of an object, the detection information is transferred to the camera control circuit 135. At this time, if the release button 120 is pushed, the imaging is, controlled by the imaging system, the image processing system, and the recording/reproducing system as described above. The diaphragm 143 adjusts the light amount of the object light passing toward an image plane in accordance with the direction from the lens control circuit 141. In addition, the camera control circuit 135 and the lens control circuit 141 can communicate with each other via a mounting electric contact (communication unit) 144a adjacent to the lens device 102 (FIG. 1) and a mounting electric contact (communication unit) 144b adjacent to the camera body 101.

Then, the optical path state of the camera according to the exemplary embodiment will be described with reference to FIGS. 3A and 3B.

Figure 3A:
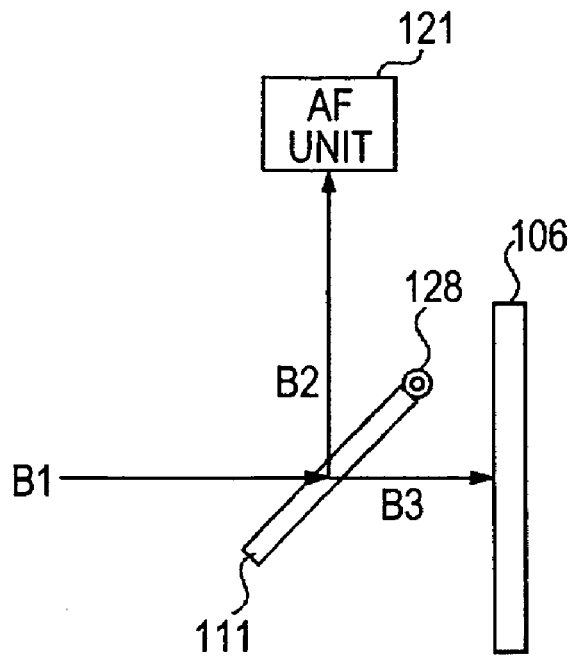
FIG. 3A is a schematic view of the camera according to the first exemplary embodiment in a first state.
Figure 3B:
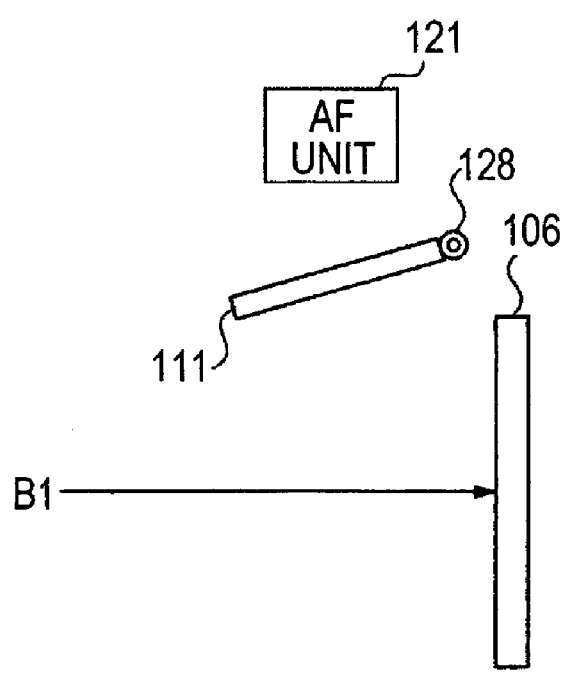
FIG. 3B is a schematic view of the camera according to the first exemplary embodiment in a second state.

FIGS. 3A and 3B schematically show the position of the main mirror 111 and the situation of the optical path from the taking lens where FIG. 3A is at the first state of the camera and FIG. 3B is at the second state. Like reference characters designate like components common to FIG. 1. Reference character B1 herein denotes a luminous flux from the taking lens, character B2 a reflected luminous flux at the main mirror, and character B3 a luminous flux transmitted through the main mirror.

FIG. 3A is a drawing of the camera at the first state. The main mirror 111 receives the luminous flux B1 from the taking lens, and directs the reflected light B2 to the AF unit 121 while the transmitted light B3 passes to the image-capturing device 106. In the first state, object images can be observed with an electronic finder by displaying an output signal of the image-capturing device 106 on the display unit (not shown). Additionally moving images can be picked up by continuously recording an object signal on the image-capturing device 106. Contemporaneously, high-speed phase-difference detection type focal detection can be executed by the AF unit 121.

FIG. 3B is a drawing of the camera at the second state, where the main mirror 111 is moved to a position evacuated from the optical path, so that the luminous flux B1 from the taking lens is introduced to the image-capturing device 106 without obstruction. In at least one exemplary embodiment, the main mirror 111 is operatively connected to a main mirror support arm (not shown), and the main mirror 111 is evacuated from the optical path by rotating the main mirror support arm about a rotating shaft 128 disposed above the main mirror 111 by a driving force from a drive source (not shown). In the imaging at this state, the light amount arriving at the image-capturing device 106 is larger than that in the first state, so that the shutter speed can be increased and the longitudinal coverage of an illumination unit can be elongated. Also, since fine images can be formed, it is suitable for enlarging picked up images to have a large sized print.

Figure 4:
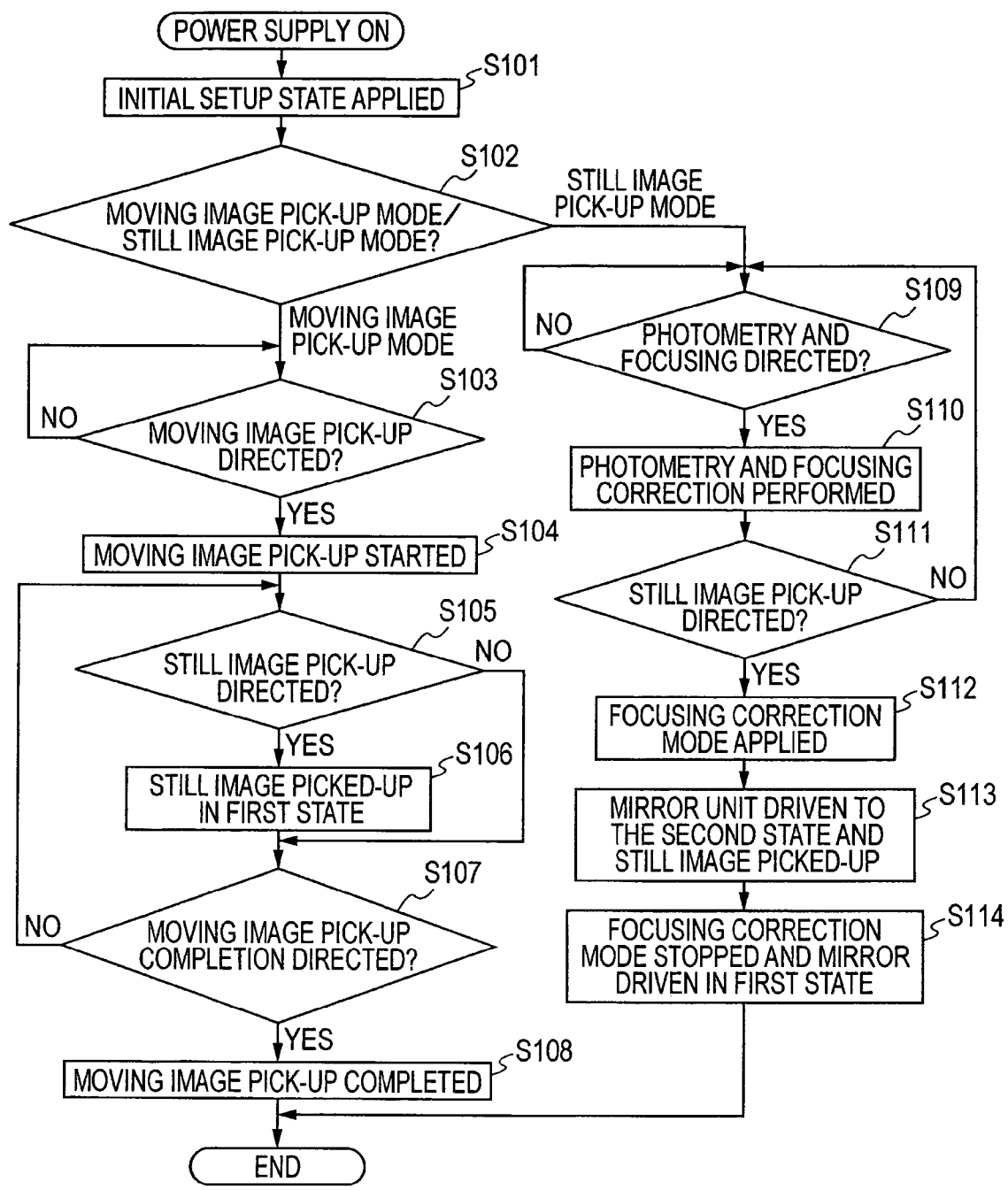
FIG. 4 is a flowchart showing the operation of the camera according to the first exemplary embodiment.

FIG. 4 is a flowchart according to the exemplary embodiment.

When the camera is activated by the turning on of a power supply, first at Step S101, various initial settings are read out and applied to the camera. At this time, the mirror is at the first state. Upon completion of Step S101, the process proceeds to Step S102.

As described above, in the camera according to the exemplary embodiment, not only still images but also moving images can be picked up, so that the mode can be set at the moving image pick-up mode or the still image pick-up mode corresponding to the direction of a picture taker. At Step S102, the setting direction is received, and if the mode selected with the mode-switching button 126 is the moving image pick-up mode, the process proceeds to Step S103 while if it is the still image pick-up mode, the process proceeds to Step S109. When the imaging mode is set in advance or any mode is set as an initial setting, the process proceeds to Step S103 or Step S109 in accordance with the set mode.

Step S103 is a stand-by state until the direction to start the moving image pick up, where the process waits in a ready state until an output of the operational detection circuit 136 is detected corresponding to operation of the trigger button 125, and upon the turning on of the trigger button 125, the process proceeds to Step S104.

At Step S104, the moving image pick-up is started so as to continue to record the moving images thereafter. During recording of the moving images, the optimal control of the image-formation optical system 103 and the diaphragm 143 is executed at predetermined time intervals, using the focal point evaluation by the AF unit 121 and the result of the photometric computation of images arriving at the image-capturing device 106.

Step S105 is a standby state until the direction to initiate still image pick up during the recording of the moving images, where the release button 120 is pushed into the second step on the basis of the output of the operational detection circuit 136. That is, upon the turning on of the switch SW2, the process proceeds to Step S106 assuming the direction to initiate still image pick up. After Step S104, as the process is controlled at predetermined time intervals on the basis of ranging and photometric results, the focusing and the optimal exposure can be maintained. Hence, at Step S106, the focusing and exposure controls need not be freshly executed. Even when the switch SW1 is turned on, the ranging and photometry need not be executed anew, and when the switch SW2 is turned on, the still images are picked up in the first state as is. If the switch SW2 is not turned on, the process proceeds to Step S107.

A method for picking up still images during the picking up the moving images will be described. The procedure is that the still images are picked up by interrupting the picking up the moving images, and then, the picking up of the moving images is restarted. However, if the processing is directly continued, the recorded data of the moving images are divided into two data sets before and after the picking up the still images, so that the continuity is not damaged in managing and reproducing the data. Therefore, during the interruption of the picking up of the moving images, by continuously using the moving image frame directly before the interruption, the continuous moving images can be picked up without the division of the moving image data across the picking up of the still images. Specifically, if the switch SW2 is turned on during the picking up of the moving images, the frame data of the moving images stored in a buffer memory (not shown) are switched from the frame data obtained by the imaging to the copy of the frame data directly before the switch SW2 is turned on. Thereafter, the still images are picked up so as to produce a still image file on the buffer memory and write it on a recording medium (e.g., a memory card) (not shown). Upon the completion of the writing on the recording medium, the system waits for the coming of the next moving image frame, and from the moment of the coming, the frame data of the moving images stored in the buffer memory is returned to the frame data obtained from the imaging so as to restart the picking up the moving images. This operation is repeated until a completion direction of the moving-image pick up is received (the completion direction will be described later), and upon the direction, the moving image file is produced using moving image data including the above mentioned frame data directly before the turning on of the switch SW2 stored in the buffer memory so as to write the file on the recording medium (e.g., the memory card).

At Step S107, the trigger button 125 is pushed on the basis of the output of the operational detection circuit 136. That is, Step S107 is a standby step continuing until the trigger button 125 is turned off. Thereby, the completion direction of the moving-image pick up is determined, and the process proceeds to Step S108 so as to complete the moving-image pick up. If the trigger button 125 is not turned off, the moving-image pick up is continued and the process is returned to Step S105.

Then, Step S109, in which the still image pick-up mode is selected, will be described. Step S109 is a standby step continuing until the switch SW1 is turned on due to the output of the operational detection circuit 136, and then the process proceeds to Step S110 corresponding to turning on and operation of the photometry by the image-capturing device 106 and the focusing by the AF unit 121. After the photometry and focusing correction are preformed, the process proceeds to step S111.

Step S111 is a standby step continuing until the turning on of switch SW2 is detected. If the image pick up is not directed at Step S111, the process is returned to Step S109. Upon the turning on of switch SW2, the process proceeds to Step S112.

At Step S112, a focusing correction mode is applied. Note that although the term "correction" is used, an improvement of the focusing falls within exemplary embodiments as well. The focusing correction mode is a mode for correcting the slippage of the focusing caused by the change in the optical path length of the luminous flux entering the main mirror 111 due to the presence of the main mirror 111 in the imaging optical path. Specifically, the phase difference between the first state, where the main mirror 111 exists in the imaging optical path, and the second state, where the main mirror 111 does not exist in the imaging optical path, is stored in advance, so that at any of the first and second states, the optimal focusing can be obtained by the focusing operation including the difference, i.e., by the driving the image-formation optical system 103. After the focusing correction mode is applied at Step S112, the process proceeds to Step S113.

At Step S113, the main mirror 111 is driven to the second state so as to pick up the still images and the process proceeds to Step S114.

Step S114 is a step for driving the main mirror 111 to the original first state. In order to correspond to change in optical path length accompanied by this step, after stopping the focusing correction mode applied at Step S112, the mirror is driven to the first state so as to complete the imaging operation.

According to the exemplary embodiment, when the still images are picked up during picking up the moving images, the still images are picked up without the evacuating of the main mirror 111 from the optical path, so that an instant image of the situation desired to be picked up as a still image can be promptly picked up with a small release time lag. Also, since the moving images can be recorded across the picking up of the still images, an image pick-up apparatus also showing the priority of the continuity of the moving images can be provided.

In the exemplary embodiment described above, the camera is described, in which the luminous flux from the taking lens is divided into two luminous fluxes by the main mirror 111, which can be a half mirror, so as to introduce the transmitted luminous flux to the image-capturing device as well as to introduce the reflected luminous flux to the AF unit 121 for focal detecting by the phase difference system. Alternatively the luminous flux reflected at the main mirror 111 can be introduced not to the AF unit 121 but to a finder optical system 108 or an AE (automatic exposure) unit for performing photometry. In the camera, mounting the finder optical system 108 instead of the AF unit 121, since an object image can be observed using an optical finder, even under a bright surrounding situation in that the display unit 107 is difficult to be observed, the object image can be clearly observed. When using the optical finder, the electric power consumption of a battery can be suppressed by prohibiting the display on the display unit. The auto focusing of the camera can be executed by a contrast detection system using the contrast of the images captured by the image-capturing device 106. Also, in the camera, mounting the AE unit instead of the AF unit, high-speed photometry is possible in comparison to the photometry by the image-capturing device 106, and thus the auto focusing can be performed by the contrast detection system.

Second Exemplary Embodiment

A camera according to a second exemplary embodiment will be described with reference to FIGS. 5 to 8B.

Figure 5:
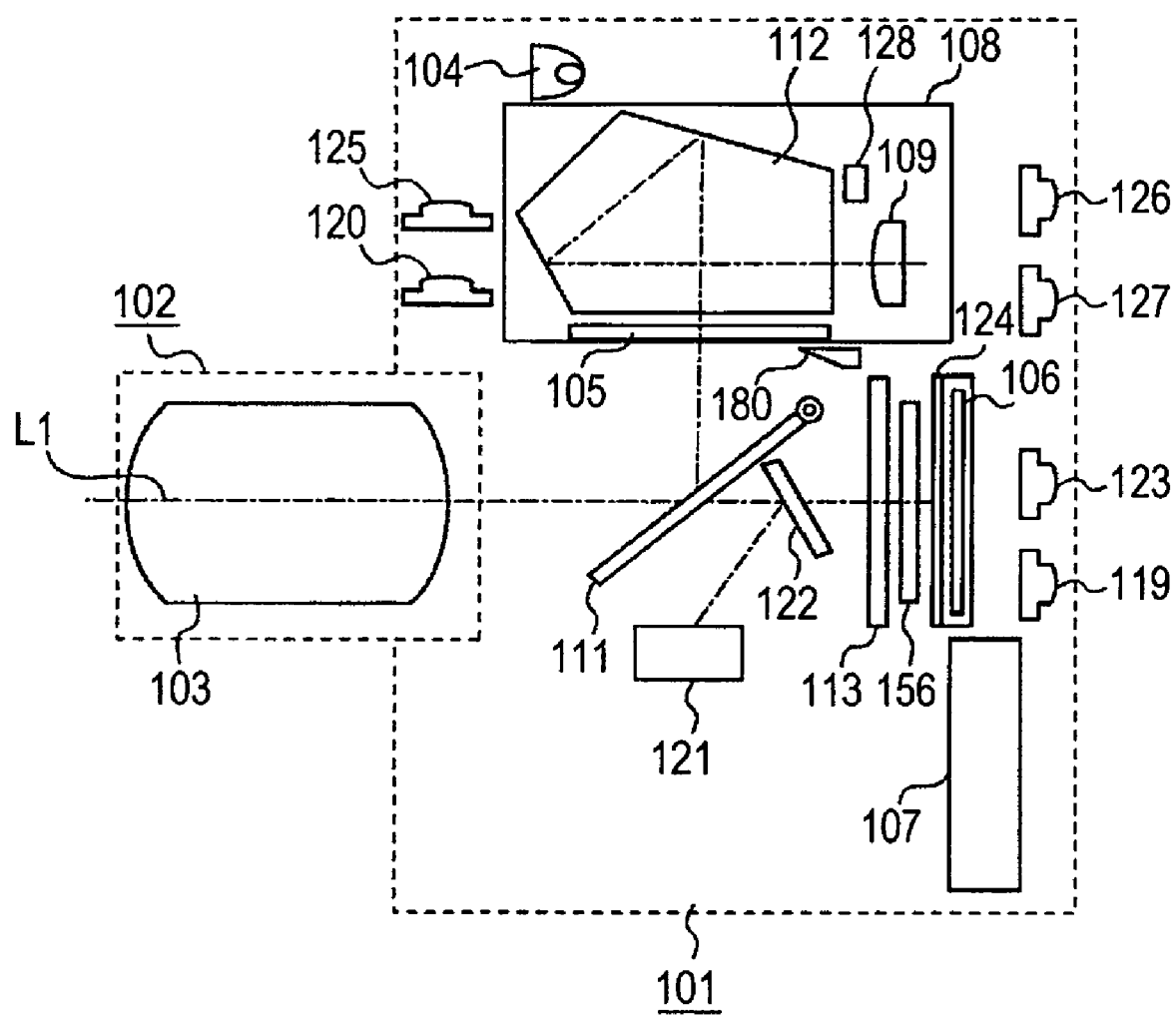
FIG. 5 is a schematic view of a configuration of a camera according to a second exemplary embodiment.

FIG. 5 is a schematic sectional view of the camera according to the exemplary embodiment viewed from the side. Like reference characters designate like components described in FIG. 1, and the description thereof is omitted.

A focusing screen 105 is arranged at an intended position of an image plane. A penta prism 112 reflects a luminous flux from the main mirror 111 multiple times (converts the luminous flux into an erect image) so as to introduce it to an eye piece 109. The eye piece 109 can be a lens for observing an object image formed on the focusing screen 105, and can include, in at least one exemplary embodiment, three lenses. The focusing screen 105, the penta prism 112, and the eye piece 109 constitute the finder optical system 108. An AE unit 128 can be used for photometry.

On the back (adjacent to the image-capturing device 106) of the main mirror 111 (first mirror), a movable sub-mirror (second mirror) 122 can be provided so as to reflect the luminous flux in the vicinity of the optical axis L1 of the luminous flux transmitted through the main mirror 111 toward the AF unit 121. The sub-mirror 122 can be drivingly connected to the main mirror 111, and can be accommodated in a lower part of a mirror box for holding the main mirror 111 and the sub-mirror 122 in first and second optical path states (below-mentioned).

A movable electric flash 104 can illuminate an object, and can protrude from the camera before use while being accommodated within the camera body 101 in unused time.

By the operation of a switch 123 for switching a finder mode, the mode can be switched between an optical finder mode (OVF mode) and an electronic finder mode (EVF mode). In the OVF mode, an object image can be observed via the finder optical system 108, and in the EVF mode, an object image can be observed via the display unit 107.

An information display unit 180 displays predetermined information (imaging information, for example) on the focusing screen 105. Thereby, when a user observes the optical finder, the picture taker can visualize the predetermined information together with an object image through the eye piece 109.

In the configuration described above, the main mirror 111 and the sub-mirror 122 selectively have three states that are in the first optical path state (first state) for introducing light to the image-capturing device 106 and the AF unit 121, the second optical path state (second state) for allowing the image-capturing device 106 to directly receive light from the image-formation optical system 103, and a third optical path state (third state) for introducing light to the finder optical system 108 and the AF unit 121, as will be described later.

In order to switch the optical path state described above into the three states at high speed, the main mirror 111, can be made of light material easy to move, for example can be made of a transparent resin so as to reduce its weight.

A mirror drive mechanism including an electromagnetic motor and a gear train (which are not shown) can switch the optical path state into the first optical path state, the second optical path state, and the third optical path state by changing positions of the main mirror 111 and the sub-mirror 122. In the image pick up in the first optical path state, since the main mirror 111 and the sub-mirror 122 are held at predetermined positions so that the mirror drive mechanism need not be operated as will be described later, high-speed continuous imaging can be executed by speeding up the image signal processing. Also, even when images are displayed on the display unit 107, the focal point can be adjusted with the phase-difference system using the AF unit 121.

Figure 6:
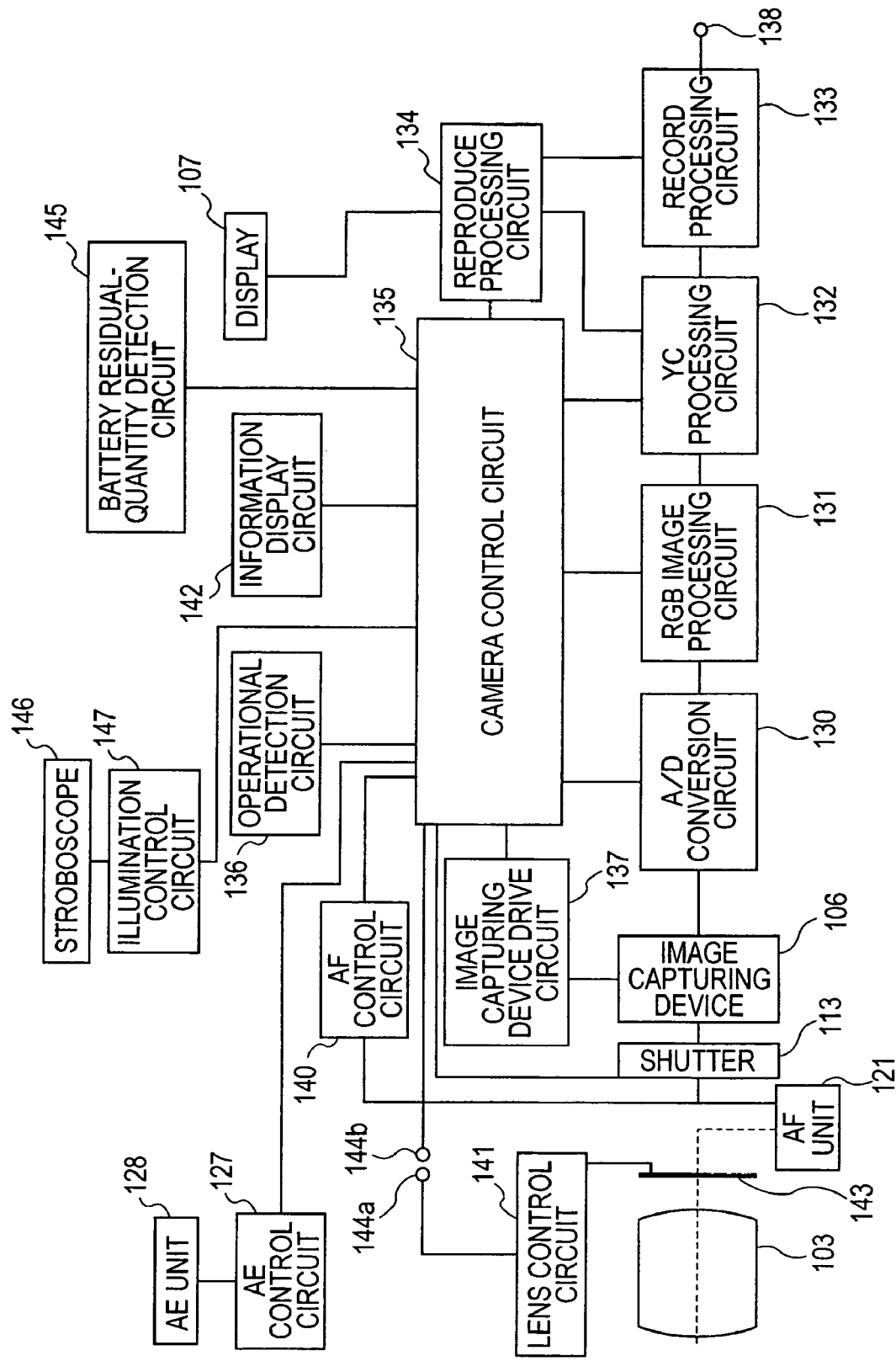
FIG. 6 is a block diagram of a circuit of the camera according to the second exemplary embodiment.

FIG. 6 is a block diagram of an electric configuration of the camera according to the second exemplary embodiment. Like reference characters designate like components common to the block diagram of the first exemplary embodiment in FIG. 2, and the description thereof is omitted.

An information display circuit 142 controls the drive of the information display unit 180, and the camera control circuit 135 controls the state of each segment of the information displayed in the optical finder by the information display circuit 142. The operational detection circuit 136 also detects the mode selected in between a moving image priority mode for having priority of the continuity of moving images and a still image priority mode for having priority of image quality of still images, in addition to the functions shown in FIG. 2.

A residual quantity of a battery for driving the electric circuit within the camera is monitored by a battery residual quantity detection circuit 145.

Furthermore, an AE control circuit 127 performs photometry by the output of the AE unit 128.

A stroboscope 146 can illuminate an object if necessary from the result of the photometry and is controlled by an illumination control circuit 147.

Figure 7A:
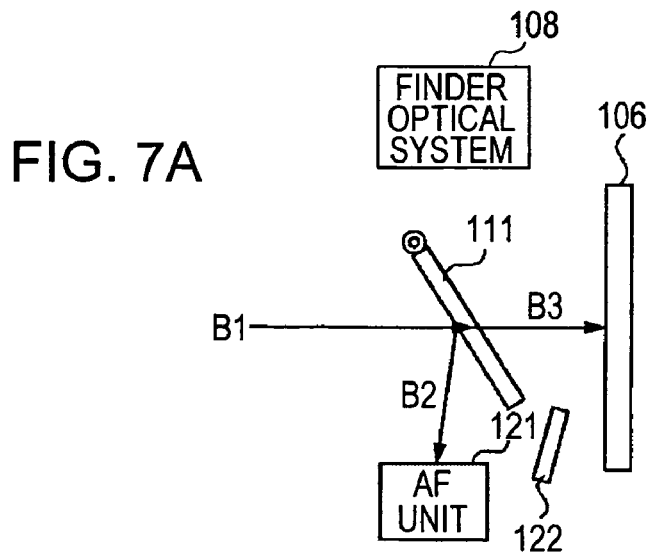
FIG. 7A is a schematic view of the camera according to the second exemplary embodiment in a first state.
Figure 7B:
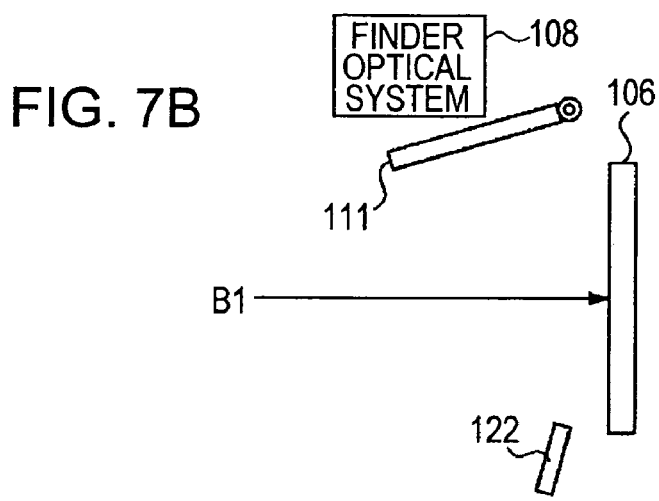
FIG. 7B is a schematic view of the camera according to the second exemplary embodiment in a second state.
Figure 7C:
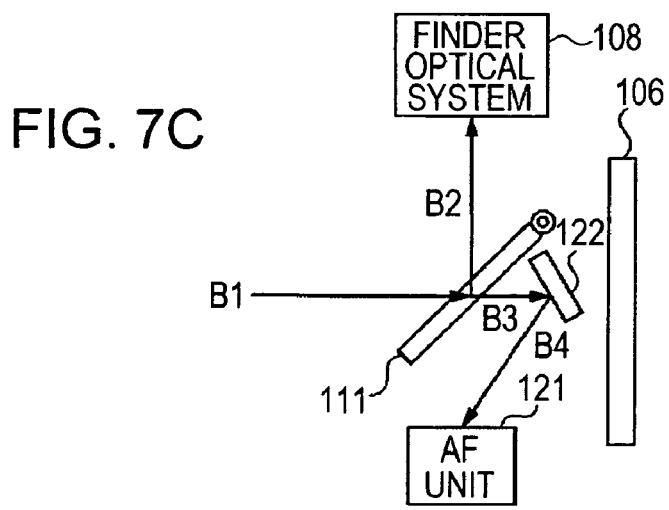
FIG. 7C is a schematic view of the camera according to the second exemplary embodiment in a third state.

The mirror drive mechanism and each optical path state will be described with reference to FIGS. 7A to 7C. FIG. 7A is a schematic view showing the positions of the main mirror 111 and the sub-mirror 122 and the situation of the luminous flux from the taking lens at the first state. FIG. 7B illustrates the second state, and FIG. 7C illustrates the third state. Like reference characters designate like components described in FIG. 1, and reference character B4 denotes a reflection luminous flux from the sub-mirror 122.

FIG. 7A is a drawing of the camera positioned in the first state. The difference from FIG. 3A is that the position of the AF unit 121 is different while the same point is that the reflection light B2 from the main mirror 111 is directed to the AF unit 121 and the transmitted light B3 is directed to the image-capturing device 106. Additionally, the sub-mirror 122 is perfectly evacuated from the optical path. In the same way as in FIG. 3A, in the first state, an object image is observed using the electric finder, and high-speed continuous imaging and moving image pick up can be executed. Also, contemporaneously, high-speed focusing can be performed with the phase-difference system using the AF unit 121.

FIG. 7B is a drawing of the camera positioned in the second state. The difference from FIG. 3B is the presence of the sub-mirror 122, which is evacuated from the optical path in the same way as in the main mirror 111, while the same point is that the luminous flux B1 from the taking lens is directly introduced to the image-capturing device 106.

Finally, FIG. 7C is a drawing of the camera positioned in the third state, in which part of the luminous flux B1 from the taking lens is reflected by the main mirror 111 and then, directed to the finder optical system 108 as the luminous flux B2. On the other hand, the luminous flux B3 transmitted through the main mirror 111 can be reflected by the sub-mirror 122 (e.g., arranged on the back of the main mirror 111) and then, directed to the AF unit 121 as the luminous flux B4. Thereby, in the third state, an object image can be observed using the finder optical system 108 while a focal point can be detected at high speed using the AF unit 121.

There are several conventional mechanisms for driving a mirror for example Japanese Patent Laid-Open No. 2004-264832, thus the description of the driving mechanism is omitted.

Figure 8B:
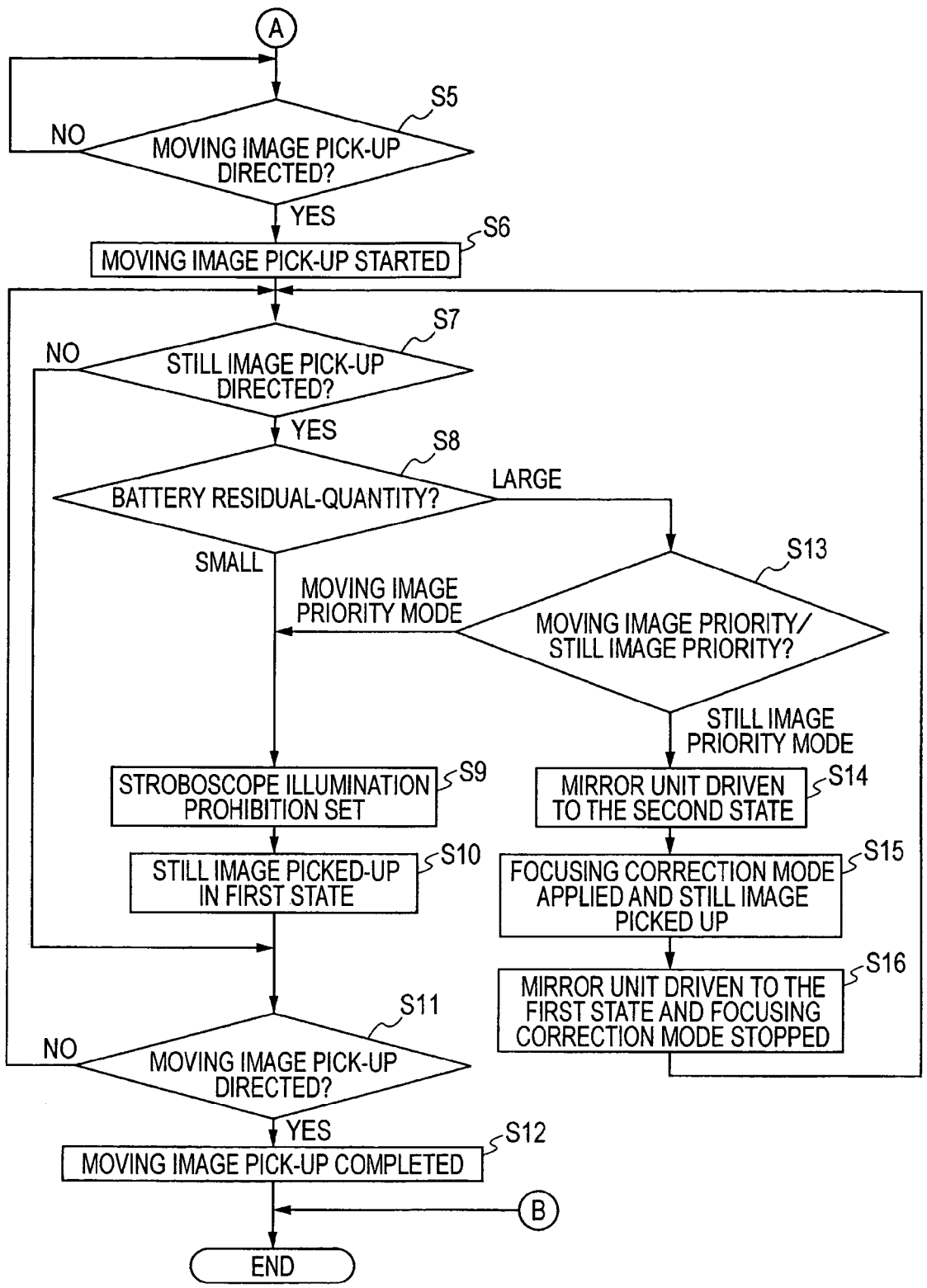

An imaging sequence of the camera according to the exemplary embodiment will be described with reference to FIGS. 8A and 8B.

When the camera is activated by the turning on of a power supply, first at Step S1, various initial settings are read out and applied to the camera. Upon completion of Step S1, the process proceeds to Step S2.

At Step S2, the finder used is set by the direction of a picture taker. That is, Step S2 is a step for receiving the setting of the finder mode and if the electronic finder mode is selected, the process proceeds to Step S3 while if it is the optical finder mode, the process proceeds to Step S23. When the finder mode is set in advance or any finder mode is set as an initial setting, the process proceeds to Step S3 or Step S23 in accordance with the mode set.

At Step S3, the main mirror 111 and the sub-mirror 122 are moved in the first state for achieving the electronic finder mode, and the process proceeds to Step S4 after an object image and predetermined information are displayed on the display unit 107.

Step S4 is a step for receiving the setting direction by a picture taker about the image pick-up mode between the moving image pick-up mode and the still image pick-up mode in the same way as in Step S102 of FIG. 4 according to the first exemplary embodiment. If the mode selected is the moving image pick-up mode, the process proceeds (A) to Step S5 (FIG. 8B) while if it is the still image pick-up mode, the process proceeds to Step S17.

Step S5 is a standby state where the process is waiting until the trigger button 125 is pushed on the basis of the output of the operational detection circuit 136. Upon the turning on of the trigger button 125, the process proceeds to Step S6.

At Step S6, the moving image pick-up is started so as to continue to record the moving images thereafter. Upon starting of the moving image pick-up, the process proceeds to Step S7.

Step S7 is a standby state waiting for the direction to start still image pick up during the recording of moving images, where the release button 120 is pushed into the second step on the basis of the output of the operational detection circuit 136. That is, upon the turning on of the switch SW2, the process proceeds to Step S8 assuming the direction to start still image pick up. If the switch SW2 is not turned on, the process proceeds to Step S11.

If the still images are picked up during the pick up of moving images when the main mirror 111 and the sub-mirror 122 are at the first state. There are two methods for picking up still images, a first method for picking up the still images without driving the main mirror 111 in the first state and a second method for picking up the still images after the main mirror 111 is evacuated from the optical path, i.e., after driving the configuration to the second state. However, in the second method, since the main mirror 111 needs to be mechanically driven, the power consumption of a battery is increased. When the still images are desired to be picked up without failure due to battery shutoff even when the battery residual quantity is small, the first method can be used. Step S8 is a step for selecting the method between the first and second methods corresponding to the battery residual quantity. On the basis of the output of the battery residual quantity detection circuit 145, if the battery residual quantity is less than a predetermined value, the process proceeds to Step S9 for picking up the still images in the first method. If it is more than that, the process proceeds to Step S13.

When the still images are picked up during pick up of the moving images, if the stroboscope 104 is illuminated during pick up of the still images, the reflection light of the stroboscope 104 can intricately enter the camera from the effect of the main mirror 111 so as to form a ghost. Therefore, when the still images are picked up without driving the main mirror 111, the illumination of the stroboscope 104 can be prohibited. Step S9 is a step for setting the stroboscope illumination prohibition, and after the setting, the process proceeds to Step S10.

At Step S10, the still images are picked up in the first state. The detailed still image pick up is the same as Step S106 in the flowchart of FIG. 4 according to the first exemplary embodiment. After the still image pick up, the process proceeds to Step S11.

At Step S11, the trigger button 125 is pushed on the basis of the output of the operational detection circuit, that is, Step S11 is a standby step for waiting until the trigger button 125 is turned off. Thereby, the direction to start moving image pick up is assumed, so that the process proceeds to Step S12 so as to complete the moving image pick up. If the trigger button 125 is not turned off, the moving image pick up is continued and the process returns to Step S7.

Then, Step S13 will be described. When the still images are picked up by the second method, since the main mirror 111 is driven during pick up of moving images, a time is necessary until the still images are picked up in comparison with the case of picking up images without driving the main mirror 111. On the other hand, when still images are picked up by the first method for picking up images without driving the main mirror 111, although a time until the imaging is small, a light amount arriving at the image-capturing device 106 is small, so that the shutter speed is decreased in comparison with the second method. During picking up still images, since the recording of moving images is stopped, when the priority is the continuity of the moving images, the first method capable of picking up the still images for a short time can be adopted. When the priority is the quality of the still images, the second method can be adopted. According to the exemplary embodiment, when the battery residual quantity is less than a predetermined value at Step S8, the process proceeds to Step S9 at which the still images are picked up by the first method in which the electric power consumption is reduced because the mirror need not be driven. Whereas, when being more than the predetermined value, a user can select the method to be adopted. Step S13 is a step for setting any of the first and second methods, in which by determining whether mode is established between the moving image priority mode having a priority of continuity of the moving images and the static image priority mode having priority of the quality of the still images, if the moving image priority mode is set, the process proceeds to Step S9 so as to pick up the still images in the first state (picking up still images by the first method). On the other hand, if the still image priority mode is set, the process proceeds to Step S14 so as to drive the mirror to the second state for picking up the still images by the second method.

At Step S15, the focusing correction mode can be applied prior to the picking up of the still images by the second method, and the process proceeds to Step S16 after the still images are picked up. The focusing correction mode can be the same as that described in the first exemplary embodiment.

At Step S16, the main mirror 111 and the sub-mirror 122 are driven to the original first state, and since the main mirror 111 is thereby returned onto the optical path, the focusing correction mode is stopped and the process returns to Step S7.

Then, Step S17 in that the still image pick-up mode is set and will be described.

Step S17 is a standby step waiting until the switch SW1 is turned on by the output of the operational detection circuit 136 to initiate the start of photometry and focusing. In accordance with the turning on, the process proceeds to Step S18 so as to perform photometry by the image-capturing device 106 and focusing by the AF unit 121.

Step S19 is a standby step waiting until the still image pick-up is directed, i.e., until the process returns to Step S2. If the still image pick-up is not directed, the process returns to Step S17. If the process returns to Step S2, the main mirror 111 and the sub-mirror 122 are driven to the second state (Step S20) and the process proceeds to Step S21.

At Step S21, the focusing correction mode is applied in the same way as in Step S15 so as to pick up the still images. Thereafter, at Step S22, the main mirror 111 and the sub-mirror 122 are driven to the original first state, and the focusing collection mode is stopped so as to complete the imaging operation.

Finally, Step S23 in that the optical finder mode is set will be described.

At Step S23, for observing an object with an optical finder, the main mirror 111 and the sub-mirror 122 are driven to a third state in that the luminous flux from the taking lens is divided into the finder optical system 108 and the AF unit 121, and the process proceeds to Step S24.

Steps S24 to S26 are similar to steps S17 to S19, the only different point is that photometry is performed with the AE unit 128. At Step S26, upon turning on the switch SW2, the process proceeds to Step S27 so as to drive the main mirror 111 and the sub-mirror 122 to the second state for picking up still images. Thereafter, the process proceeds to Step S28.

At Step S28, the main mirror 111 and the sub-mirror 122 are driven to the original third state so as to complete the imaging operation.

According to the exemplary embodiment, in the first state part of the luminous flux from the taking lens is reflected to the AF unit 121 for focusing with the phase-difference system while the residual luminous flux is introduced to the image-capturing device, by the first method for picking up still images without evacuating the main mirror 111 from the optical path. The still images are picked up during the recording of moving images, and an instant image of the situation desired to be picked up as a still image can be promptly picked up with a small release time lag when the still images are picked up during recording the moving images. Also the continuity of the moving images during picking up can also have priority. If the battery residual quantity is a predetermined value or less, by picking up still images automatically using the first method, the imaging failure due to battery shutoff can be reduced. Furthermore, a picture taker can set the still image priority mode for having priority of image quality of still images and the moving image priority mode for having priority of the continuity of the moving images, so that the first method for picking up without evacuating the main mirror 111 from the optical path and the second method for picking up still images by evacuating it are properly used depending on the will of the picture taker. The optical path length can be different between the first imaging method and the second imaging method. However, well-focused images can be taken with any method by recording the optical path length difference in advance so as to reflect it on the focal point evaluated value.

Other Exemplary Embodiments

According to the first exemplary embodiment described above, when still images are picked-up during recording moving images, functions described in the second exemplary embodiment can be added to the first exemplary embodiment, (e.g., selection between the moving image priority mode and the still image priority mode). The first method of picking-up still images without evacuating the mirror from the optical path corresponding to the battery residual quantity and the second method of picking-up by evacuating it, and further setting prohibition of illumination of the stroboscope in the first method can be used.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-081589 filed Mar. 22, 2005, which is hereby incorporated by reference herein in its entirety.

What is claimed is:

1. An image pick-up apparatus comprising:
   an image-capturing device configured to convert an object image photo-electrically, formed by a luminous flux from a taking lens;
   a mirror unit including a half mirror occupying at least part of the region of the mirror unit;
   a drive unit configured to drive the mirror unit between a first state where part of the luminous flux is transmitted through the mirror unit to the image-capturing device while the residual luminous flux is reflected to a predetermined unit and a second state where the entire luminous flux is introduced to the image-capturing device without being reflected by and transmitted through the mirror unit;
   an image pickup mode setting unit configured to set either a moving image pickup mode for picking up moving images or a still image pickup mode for picking up still images;
   the moving image pickup starting unit configured to start picking up the moving images in a case where the moving image pickup move is set; and
   a control unit configured to control the drive unit to drive the mirror unit, wherein the mirror unit is driven to the first state before the image pick-up apparatus is in an image pickup stand-by state, and
   wherein if the first still image pickup starting unit instructs to start picking up the still images while the moving image pickup mode is set, the still images are picked up in the first state without driving the mirror unit, and if the still image pickup starting unit instructs to pickup the still images while the still image pickup mode is set, the still images are picked up after the driving unit drives the mirror unit from the first state to the second state.

2. The apparatus according to claim 1, wherein the predetermined unit includes an automatic focus unit.

3. The apparatus according to claim 1, wherein the predetermined unit includes an automatic exposure unit.

4. The apparatus according to claim 1, wherein the predetermined unit includes an optical finder.

5. The apparatus according to claim 1, wherein the apparatus is configured to include a still image priority mode configured to have priority of image quality of still images when the still images are picked up in the moving image pick-up mode and a moving image priority mode configured to have priority of the continuity of the moving images during picking up, wherein in the still image priority mode, still images are picked up after the mirror unit is driven by the drive unit from the first state to the second state.

6. The apparatus according to claim 1, further comprising a battery residual quantity detection unit, wherein in the first state, if a battery residual quantity is determined to be a predetermined value or less by the battery residual quantity detection unit, still images are picked up without driving the drive unit.

7. The apparatus according to claim 1, further comprising:
   a stroboscope; and
   an illumination control unit configured not to allow the stroboscope to illuminate light when still images are picked up in the first state during the pick-up of moving images.

8. The apparatus according to claim 2, further comprising a focal point correction unit configured to improve a focal point evaluated value detected by the automatic focus unit in consideration of an optical path length difference generated by the presence of the mirror unit, the optical path length difference defined by the difference between the optical path when the apparatus is in the first state and when it is in the second state.

9. An image pick-up apparatus comprising:
   an image-capturing device configured to convert an object image photo-electrically, formed by a luminous flux from a taking lens;
   a mirror unit including a half mirror occupying at least part of the region of the mirror unit;
   a drive unit configured to drive the mirror unit between a first state where part of the luminous flux is transmitted through the mirror unit to the image-capturing device while the residual luminous flux is reflected to a predetermined unit and a second state where the entire luminous flux is directed to the image-capturing device without being reflected by and transmitted through the mirror unit;
   a moving image pickup starting unit configured to instruct to start picking up moving images;
   a still image pickup starting unit configured to instruct to start picking up still images; and
   a control unit configured to control the drive unit to drive the mirror unit,
   wherein the mirror unit is driven to the first state before the image pick-up apparatus is in an image pickup stand-by state, and
   wherein if the still image pickup starting unit instructs to start picking up the still images while picking up the moving images, the still images are pickup up in the first state without driving the mirror unit, and if the still image pickup starting unit instructs to pickup the still images while not picking up the moving images, the still image are picked up after drive unit drives the mirror unit from the first state to the second state.

10. The apparatus according to claim 9, wherein the predetermined unit includes an automatic focus unit.

11. The apparatus according to claim 9, wherein the predetermined unit includes an automatic exposure unit.

12. The apparatus according to claim 9, wherein the predetermined unit includes an optical finder.

13. The apparatus according to claim 9, further comprising a battery residual quantity detection unit, wherein in the first state, if a battery residual quantity is determined to be a predetermined value or less by the battery residual quantity detection unit, still images are picked up without driving the drive unit.

14. The apparatus according to claim 9, further comprising:
a stroboscope; and
an illumination control unit configured not to allow the stroboscope to illuminate light when still images are picked up in the first state during the picking up of moving images.

15. The apparatus according to claim 10, further comprising a focal point correction unit configured to improve a focal point evaluated value detected by the automatic focus unit in consideration of an optical path length difference generated by the presence of the mirror unit, the optical path length difference defined as the difference between the optical path when the apparatus is in the first state and when the apparatus in the second state.

16. An image pick-up apparatus comprising:
an image-capturing device configured to convert an object image photo-electrically, formed by a luminous flux from a taking lens;
a main mirror unit including a half mirror occupying at least part of the region of the mirror unit;
a sub-mirror unit including a total reflection mirror;
an optical finder configured to observe the object image;
an automatic focus unit configured to detect the focusing state of the taking lens with a phase-difference system;
a drive unit configured to switch the main mirror unit and the sub-mirror unit among a first state where part of the luminous flux is reflected by the main mirror unit to the automatic focus unit while the residual luminous flux is directed to the image-capturing device by evacuating the sub-mirror unit from the luminous flux, a second state where the entire luminous flux is directed to the image-capturing device without being reflected by and transmitted through the main mirror unit and the sub-mirror unit, and a third state where part of the luminous flux is reflected by the main mirror unit to the optical finder while the transmitted residual luminous flux is introduced to the automatic focus unit by reflecting it at the sub-mirror unit;
an electronic finder configured to display an object signal electronically, where the electronic finder is formed, in the first state, on the image-capturing device on a display unit;
a finder mode setting unit configured to set an optical or electrical finder mode using the electronic finder;
an image pickup mode setting unit configured to set a moving image pickup mode for picking up moving images or a still image pickup mode for a picking up still images;
a moving image pickup starting unit configured to instruct to start picking up the moving images when the moving pickup mode is set;
a still image pickup starting unit configured to instruct to start picking up the still images regardless of an image pickup mode set by the image pickup mode setting unit; and
a control unit configured to control the drive unit to drive the main mirror unit and the sub-mirror unit,
wherein, in a case where the finder mode setting unit sets the electronic finder mode, the main mirror unit and the sub-mirror unit are driven to the first state, then if the still image starting unit instructs to start picking up the still images while the image pickup mode setting unit set the moving image pickup mode, the still images being picked up in the first state without driving the main mirror unit and the sub-mirror unit, and if the still image pickup starting unit instructs to start picking up the still images while the image pickup mode setting unit sets the still image pickup mode, the still images being picked up after driving the main mirror unit and the sub-mirror unit from the first state to the second state, and
wherein, in a case where the finder mode setting unit sets the optical finder mode, the main mirror unit and the sub-mirror unit are driven to the third state, then if the still image pickup starting unit instructs to start picking up the still images while the image pickup mode setting unit sets the still image pickup mode, the still images being picked up after driving the main mirror unit and the sub-mirror unit from the third state to the second state.

17. The apparatus according to claim 16, wherein the apparatus is configured to include a still image priority mode configured to have priority of image quality of still images when the still images are picked up in the moving image pick-up mode and a moving image priority mode configured to have priority of the continuity of the moving images during picking up, wherein in the still image priority mode, still images are picked up after the main mirror unit and the sub-mirror unit are driven by the drive unit from the first state to the second state.

18. The apparatus according to claim 16, further comprising a battery residual quantity detection unit, wherein in the first state, if a battery residual quantity is determined to be a predetermined value or less by the battery residual quantity detection unit, still images are picked up without driving the drive unit.

19. The apparatus according to claim 16, further comprising:
a stroboscope; and
an illumination control unit configured not to allow the stroboscope to illuminate light when still images are picked up in the first state during picking up moving images.

20. The apparatus according to claim 16, further comprising a focal point correction unit configured to improve a focal point evaluated value detected by the automatic focus unit in consideration of an optical path length difference generated by the presence of the main mirror unit, the optical path length difference defined as the difference of the optical path when the apparatus is in the first state and when the apparatus is in the second state.

21. The apparatus according to claim 16, further comprising a display control unit configured to operate the electronic finder when the main mirror unit and the sub-mirror unit are at the first state in the still image pick-up mode.

* * * * *